(12) United States Patent
Koh

(10) Patent No.: US 8,745,533 B2
(45) Date of Patent: Jun. 3, 2014

(54) METHOD FOR DISPLAYING WEB PAGE AND MOBILE TERMINAL USING THE SAME

(75) Inventor: Han Deck Koh, Seoul (KR)

(73) Assignee: LG Electronics Inc., Seoul (KR)

( * ) Notice: Subject to any disclaimer, the term of this patent is extended or adjusted under 35 U.S.C. 154(b) by 569 days.

(21) Appl. No.: 12/483,753

(22) Filed: Jun. 12, 2009

(65) Prior Publication Data

US 2010/0235737 A1 Sep. 16, 2010

(30) Foreign Application Priority Data

Mar. 10, 2009 (KR) ........................ 10-2009-0020206

(51) Int. Cl.
*G06F 3/048* (2013.01)

(52) U.S. Cl.
USPC ........................................................ 715/828

(58) Field of Classification Search
USPC ........................... 715/864, 704, 234; 709/203
See application file for complete search history.

(56) References Cited

U.S. PATENT DOCUMENTS

| | | | | |
|---|---|---|---|---|
| 5,953,392 | A * | 9/1999 | Rhie et al. ................... | 379/88.13 |
| 6,119,078 | A * | 9/2000 | Kobayakawa et al. ............ | 704/3 |
| 6,775,805 | B1 * | 8/2004 | Watanabe et al. .............. | 715/202 |
| 6,857,131 | B1 * | 2/2005 | Yagawa et al. ................. | 725/112 |
| 6,954,638 | B2 * | 10/2005 | Matto ......................... | 455/426.1 |
| 7,289,980 | B2 * | 10/2007 | Kogut-O'Connell et al. ........ | 1/1 |
| 7,506,253 | B2 * | 3/2009 | Armstrong et al. ........... | 715/256 |
| 7,603,409 | B2 * | 10/2009 | Kobayashi et al. ........... | 709/203 |
| 7,783,572 | B2 * | 8/2010 | Fang et al. ....................... | 705/50 |
| 7,810,049 | B2 * | 10/2010 | Werwath et al. .............. | 715/838 |
| 7,949,645 | B2 * | 5/2011 | Chien et al. ................... | 707/706 |
| 8,176,431 | B1 * | 5/2012 | Scannell et al. .............. | 715/762 |
| 2002/0062396 | A1 * | 5/2002 | Kakei et al. .................... | 709/246 |
| 2004/0192299 | A1 * | 9/2004 | Wilson et al. ................. | 455/433 |
| 2005/0138633 | A1 * | 6/2005 | Barsade et al. ............... | 719/313 |
| 2006/0217126 | A1 * | 9/2006 | Sohm et al. ................... | 455/454 |
| 2008/0004084 | A1 * | 1/2008 | Park .............................. | 455/566 |
| 2009/0042547 | A1 * | 2/2009 | Heo et al. .................... | 455/414.1 |
| 2010/0060650 | A1 * | 3/2010 | Yamakami .................... | 345/474 |

* cited by examiner

*Primary Examiner* — Phenuel Salomon
(74) *Attorney, Agent, or Firm* — Birch, Stewart, Kolasch & Birch, LLP

(57) ABSTRACT

A mobile terminal including a display unit configured to display a web-page; a memory configured to store a first internet driving program and a second internet driving program for executing the web-page; a wireless communication module configured to access an internet server; a user input unit configured to receive a user input signal; and a controller configured to display an internet program sort option menu on the display unit based on the user input signal from the user input unit during an attempt to display the web-page by accessing the internet server through the wireless communication module through the first internet driving program stored in the memory, to terminate the first internet driving program, and to execute the second internet driving program, by the internet program sort option menu.

18 Claims, 8 Drawing Sheets

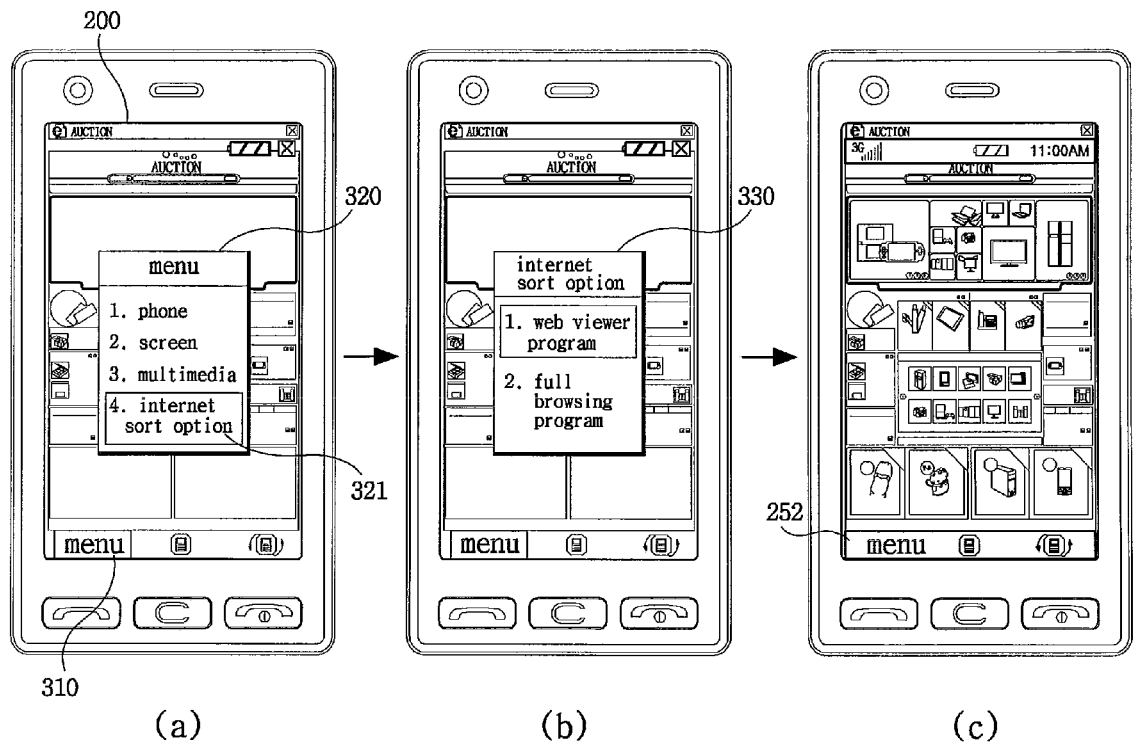

METHOD FOR DISPLAYING WEB PAGE AND MOBILE TERMINAL USING THE SAME

This application claims the benefit of the Korean Patent Application No. 10-2009-0020206, filed on Mar. 10, 2009, which is hereby incorporated by reference as if fully set forth herein.

BACKGROUND OF THE DISCLOSURE

1. Field of the Disclosure

The present disclosure relates to a method for displaying web page and a mobile terminal using the same.

2. Discussion of the Related Art

Generally, terminals can be classified into mobile/portable terminals and stationary terminals. The mobile terminals can be further classified into handheld terminals and vehicle mount terminals according to possibility of user's direct portability.

As functions of the terminal are diversified, the terminal is implemented as a multimedia player provided with composite functions such as photographing of photos or moving pictures, playback of music or moving picture files, game play, broadcast reception and the like, to name some.

To support and increase of the terminal functions, it may be able to consider the improvement of structural part and/or software part of the terminal. The recent mobile terminal has been improved to have various functions as a multimedia player as well as a basic function such as call.

For example, the mobile terminal may access the internet server to display the web page through the wireless communication network (also known as the mobile communication network) for telephone call.

Furthermore, the mobile terminal may include a short-range wireless communication means such as Bluetooth. The mobile terminal may transmit and receive files through the short-range wireless communication channel between the terminals having the short-range wireless communication means.

SUMMARY OF THE DISCLOSURE

Accordingly, an object of the present disclosure is to provide a mobile terminal comprising: a display unit configured to display a web-page; a memory configured to store a first internet driving program and a second internet driving program for executing the web-page; a wireless communication module configured to access an internet server; a user input unit configured to receive a user input signal; and a controller configured to display an internet program sort option menu on the display unit by means of the user input signal from the user input unit during an attempt to display the web-page by accessing the internet server through the wireless communication module through the first internet driving program stored in the memory, to terminate the first internet driving program, and to execute the second internet driving program, by means of the internet program sort option menu.

According to the one aspect of the present disclosure, the first internet driving program is a full browsing program, and the second internet driving program is a web viewer program.

According to another aspect of the present disclosure, the controller executes the second internet driving program stored in the memory and terminates the first internet driving program, if a display of the web page is not completed within a predetermined time.

According to still another aspect of the present disclosure, the controller executes the second internet driving program stored in the memory and terminates the first internet driving program, if the web page includes one of a flash and a script.

According to still further aspect of the present disclosure, the web page comprises an HTML (HyperText Markup-Language), data having a browser characteristic tag.

According to still further aspect of the present disclosure, the first internet driving program is a program for accessing a first server, and the second internet driving program is a program for accessing a second program.

Moreover, another object of the present disclosure is to provide a mobile terminal comprising: a display unit configured to display a web-page; a memory configured to store a first internet driving program and a second internet driving program for executing the web-page; a wireless communication module configured to access an internet server; and a controller configured to determine whether a driving condition for the second internet driving program is satisfied during an attempt to display the web-page by accessing the internet server through the wireless communication module through the first internet driving program stored in the memory, to terminate the first internet driving program, and to execute the second internet driving program, by means of an internet program sort option menu.

According to another aspect of the present disclosure, the first internet driving program is a full browsing program, and the second internet driving program is a web viewer program.

According to another aspect of the present disclosure, the controller executes the second internet driving program stored in the memory and terminates the first internet driving program, if a display of the web page is not completed within a predetermined time.

According to another aspect of the present disclosure, the controller executes the second internet driving program stored in the memory and terminates the first internet driving program, if the web page includes one of a flash and a script.

According to another aspect of the present disclosure, the locking-release icon is a direction icon, and the controller controls release of the locking if a drag signal to the direction icon is generated.

According to another aspect of the present disclosure, the mobile terminal may further include a user input unit configured to receive a user input signal, wherein the controller controllably displays a second internet driving program request massage on the display unit when the driving condition is satisfied, and controllably terminates the first internet driving program to execute the second internet driving program if a request for executing the second internet driving program is received from the user input unit.

According to still further aspect of the present disclosure, the web page comprises an HTML data having a browser characteristic tag.

According to still further aspect of the present disclosure, the first internet driving program is a program for accessing a first server, and the second internet driving program is a program for accessing a second program.

According to still further aspect of the present disclosure, an internet driving program indicator is displayed on the display unit, and the controller controllably terminates the first internet driving program to execute the second internet driving program stored in the memory if the internet driving program indicator is selected.

Another object of the present disclosure is to provide a method for displaying a web-page, the method comprising: storing a first internet driving program and a second internet driving program; attempting to display the web-page by executing the first internet driving program; determining whether a driving condition for the second internet driving program is satisfied; and displaying the web-page by terminating the first internet driving program and by executing the second internet driving program if the driving condition is satisfied.

According to another aspect of the present disclosure, the first internet driving program is a full browsing program, and the second internet driving program is a web viewer program.

According to another aspect of the present disclosure, the step of determining whether a driving condition for the second internet driving program is satisfied comprises determining whether a display of the web page is completed within a predetermined time.

According to another aspect of the present disclosure, the step of determining whether a driving condition for the second internet driving program is satisfied comprises determining whether the web page includes one of a flash and a script.

According to another aspect of the present disclosure, the step of displaying the web-page by terminating the first internet driving program and by executing the second internet driving program if the driving condition is satisfied comprises displaying a second driving program request message on the display unit, the second driving program request message asking whether a user want to execute the second internet driving program, and generating an input signal for driving the second internet driving program in a state of displaying the request message.

According to another aspect of the present disclosure, the step of displaying the web-page by terminating the first internet driving program and by executing the second internet driving program if the driving condition is satisfied comprises displaying an internet program sort option menu on the display unit, and selecting the second internet driving program by using the internet program sort option menu.

Additional advantages, objects, and features of the disclosure will be set forth in part in the description which follows and in part will become apparent to those having ordinary skill in the art upon examination of the following or may be learned from practice of the disclosure. The objectives and other advantages of the disclosure may be realized and attained by the structure particularly pointed out in the written description and claims hereof as well as the appended drawings.

It is to be understood that both the foregoing general description and the following detailed description of the present disclosure are exemplary and explanatory and are intended to provide further explanation of the disclosure as claimed.

BRIEF DESCRIPTION OF THE DRAWINGS

The accompanying drawings, which are included to provide a further understanding of the disclosure and are incorporated in and constitute a part of this application, illustrate embodiment(s) of the disclosure and together with the description serve to explain the principle of the disclosure. In the drawings:

FIG. 8 illustrates image diagrams of a method for displaying a web page according to the another embodiment of the present disclosure FIG. 9 is a figure for explaining an HTML data applied to one embodiment of the present disclosure.

DETAILED DESCRIPTION OF THE DISCLOSURE

Reference will now be made in detail to the preferred embodiments of the present disclosure, examples of which are illustrated in the accompanying drawings. Wherever possible, the same reference numbers will be used throughout the drawings to refer to the same or like parts. The suffixes 'module' and 'unit' for the elements used in the following description are given or used in common by considering facilitation in writing this disclosure only but fail to have meanings or roles discriminated from each other.

First of all, mobile terminals described in this disclosure can include a mobile phone, a smart phone, a laptop computer, a digital broadcast terminal, a PDA (personal digital assistant), a PMP (portable multimedia player), a navigation system and the like.

Except for applicable to a mobile terminal only, it is apparent to those skilled in the art that the configurations according to an embodiment described in this disclosure are applicable to such stationary terminals as a digital TV, a desktop computer and the like.

Figure 1:
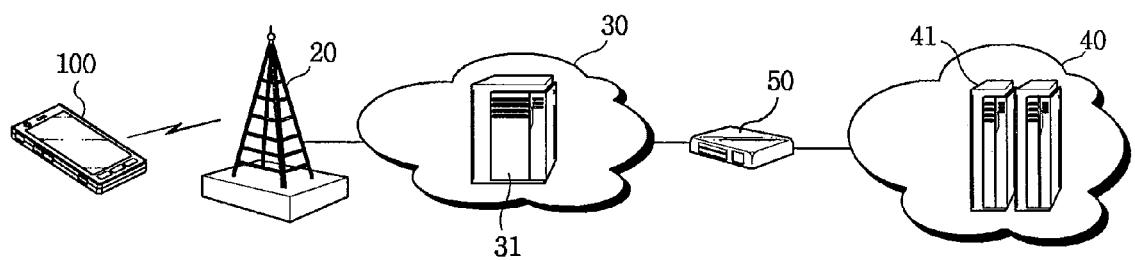
FIG. 1 is a schematic block diagram of an internet system where a plurality of the internet driving program is applied, according to one embodiment of the present disclosure.

FIG. 1 is a schematic block diagram of an internet system where a plurality of the internet driving programs are applied, according to one embodiment of the present disclosure. As shown in FIG. 1, an internet system which is applied to the present disclosure may include a mobile terminal 100, a base station 20, a mobile communication packet network 30 including a convert server 31, an internet network 40 including a web page provider server 41, and a router 50.

A mobile terminal 100 executes to browse a web page through a wireless internet. The mobile terminal may be one of a handset, a cell phone, and a PDA. The structure of the mobile terminal will be explained by referring to FIG. 2 in the following description.

A base station 20 is an element for forming a wireless channel with the mobile terminal 100. The mobile terminal receives a signal from the base station 20.

A mobile communication packet network 30 is a network supporting a connection between mobile terminals 100 for the telephone call and a connection for a data communication. The mobile communication packet network 30 according to the present disclosure includes a convert server 31. In a case that the convert server 31 receives a web page request signal from the mobile terminal 100, the convert server requests the web page provider server 41 of the internet network 40 to transmit the web page based on an address information of the web page. The convert server 31 determines whether an internet program executed in the mobile terminal 100 is a full browsing program or a web viewer program based on the internet driving program information included in the request signal. If the browser which is executed in the mobile terminal 100 is a full browsing program, the convert server 31 transmits a web page receive from the web page provider server 41 to the mobile terminal 100 without modification. However, if the browser which is executed in the mobile terminal 100 is a web viewer program, the convert server 31 converts a web page to a single image, where the web page is received from the web page provider server 41. Then, the convert 31 transmits the single image to the mobile terminal 100. Here, the single image may be a single file image or an image stream.

An internet network 40 is a network where a plurality of the computers are connected one another based on the TCP/IP. The internet network 40 according to the present disclosure includes a web page provider server 41. The web page provider server 41 is a server providing a web page which is written by mark-up language. Here, the mark-up language is a language adding a special meaning by attaching a tag in the some text. The example of the mark up language includes an HTML (HyperText Markup-Language), an XML (eXtensible Markup Language), an WML (Wireless Markup Language) and so on.

In the following description, the structure of the mobile terminal 100 will be described by referring FIG. 2.

Figure 2:
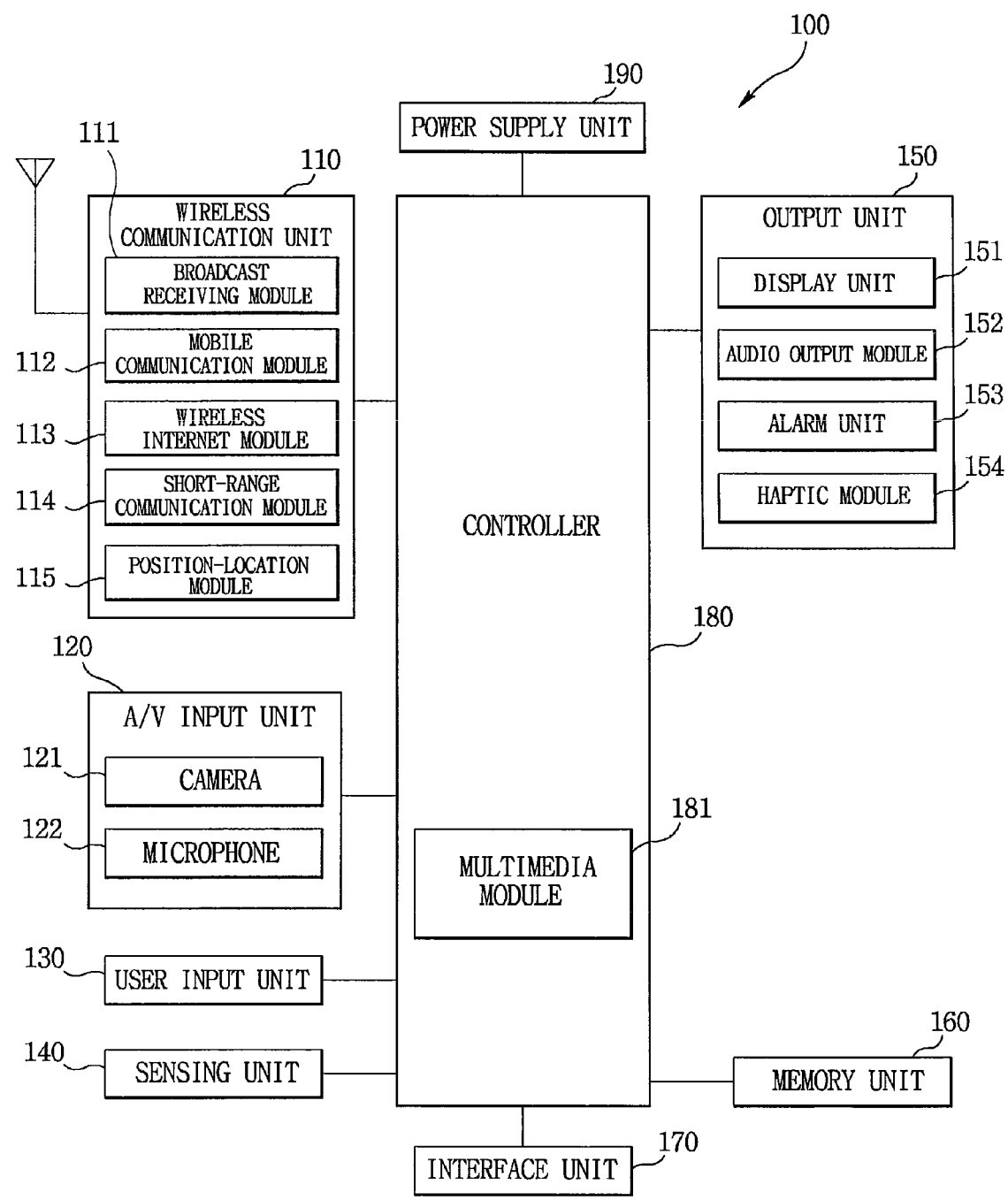
FIG. 2 is a block diagram of mobile terminal related to the one embodiment of the present disclosure.

FIG. 2 is a block diagram of a mobile terminal according to one embodiment of the present disclosure.

Referring to FIG. 2, a mobile terminal 100 according to one embodiment of the present disclosure includes a wireless communication unit 110, an A/V (audio/video) input unit 120, a user input unit 130, a sensing unit 140, an output unit 150, a memory 160, an interface unit 170, a controller 180, a power supply unit 190, and the like. FIG. 2 shows the mobile terminal 100 having various components, but it is understood that implementing all of the illustrated components is not a requirement. Greater or fewer components may alternatively be implemented.

In the following description, the above elements of the mobile terminal 100 are explained in sequence.

First of all, the wireless communication unit 110 typically includes one or more components which permits wireless communication between the mobile terminal 100 and a wireless communication system or network within which the mobile terminal 100 is located. For instance, the wireless communication unit 110 can include a broadcast receiving module 111, a mobile communication module 112, a wireless internet module 113, a short-range communication module 114, a position-location module 115 and the like.

The broadcast receiving module 111 receives a broadcast signal and/or broadcast associated information from an external broadcast managing server via a broadcast channel.

The broadcast channel may include a satellite channel and a terrestrial channel.

The broadcast managing server generally refers to a server which generates and transmits a broadcast signal and/or broadcast associated information or a server which is provided with a previously generated broadcast signal and/or broadcast associated information and then transmits the provided signal or information to a terminal. The broadcast signal may be implemented as a TV broadcast signal, a radio broadcast signal, and a data broadcast signal, among others. If desired, the broadcast signal may further include a broadcast signal combined with a TV or radio broadcast signal.

The broadcast associated information includes information associated with a broadcast channel, a broadcast program, a broadcast service provider, etc. And, the broadcast associated information can be provided via a mobile communication network. In this case, the broadcast associated information can be received by the mobile communication module 112.

The broadcast associated information can be implemented in various forms. For instance, broadcast associated information may include an electronic program guide (EPG) of digital multimedia broadcasting (DMB) and electronic service guide (ESG) of digital video broadcast-handheld (DVB-H).

The broadcast receiving module 111 may be configured to receive broadcast signals transmitted from various types of broadcast systems. By nonlimiting example, such broadcasting systems include digital multimedia broadcasting-terrestrial (DMB-T), digital multimedia broadcasting-satellite (DMB-S), digital video broadcast-handheld (DVB-H), the data broadcasting system known as media forward link only (MediaFLO®) and integrated services digital broadcast-terrestrial (ISDB-T). Optionally, the broadcast receiving module 111 can be suitably configured for other broadcasting systems as well as the above-explained digital broadcasting systems.

The broadcast signal and/or broadcast associated information received by the broadcast receiving module 111 may be stored in a suitable device, such as a memory 160.

The mobile communication module 112 transmits/receives wireless signals to/from one or more network entities (e.g., base station, external terminal, server, etc.). Such wireless signals may represent audio, video, and data according to text/multimedia message transceivings, among others.

The wireless internet module 113 supports Internet access for the mobile terminal 100. This module may be internally or externally coupled to the mobile terminal 100. In this case, the wireless Internet technology can include WLAN (Wireless LAN) (Wi-Fi), Wibro (Wireless broadband), Wimax (World Interoperability for Microwave Access), HSDPA (High Speed Downlink Packet Access), etc.

The short-range communication module 114 facilitates relatively short-range communications. Suitable technologies for implementing this module include radio frequency identification (RFID), infrared data association (IrDA), ultra-wideband (UWB), as well as the networking technologies commonly referred to as Bluetooth and ZigBee, to name a few.

The position-location module 115 identifies or otherwise obtains the location of the mobile terminal 100. If desired, this module may be implemented with a global positioning system (GPS) module.

Referring to FIG. 2, the audio/video (A/V) input unit 120 is configured to provide audio or video signal input to the mobile terminal 100. As shown, the A/V input unit 120 includes a camera 121 and a microphone 122. The camera 121 receives and processes image frames of still pictures or video, which are obtained by an image sensor in a video call mode or a photographing mode. And, the processed image frames can be displayed on the display 151.

The image frames processed by the camera 121 can be stored in the memory 160 or can be externally transmitted via the wireless communication unit 110. Optionally, at least two cameras 121 can be provided to the mobile terminal 100 according to environment of usage.

The microphone 122 receives an external audio signal while the portable device is in a particular mode, such as phone call mode, recording mode and voice recognition. This audio signal is processed and converted into an electric audio data. The processed audio data is transformed into a format transmittable to a mobile communication base station via the mobile communication module 112 in case of a call mode. The microphone 122 typically includes assorted noise removing algorithms to remove noise generated in the course of receiving the external audio signal.

The user input unit 130 generates input data responsive to user manipulation of an associated input device or devices. Examples of such devices include a keypad, a dome switch, a touchpad (e.g., static pressure/capacitance), a jog wheel, a jog switch, etc.

The sensing unit 140 provides sensing signals for controlling operations of the mobile terminal 100 using status measurements of various aspects of the mobile terminal. For instance, the sensing unit 140 may detect an open/close status of the mobile terminal 100, relative positioning of components (e.g., a display and keypad) of the mobile terminal 100, a change of position of the mobile terminal 100 or a component of the mobile terminal 100, a presence or absence of user contact with the mobile terminal 100, orientation or acceleration/deceleration of the mobile terminal 100. As an example, consider the mobile terminal 100 being configured as a slide-type mobile terminal. In this configuration, the sensing unit 140 may sense whether a sliding portion of the mobile terminal is open or closed. Other examples include the sensing unit 140 sensing the presence or absence of power provided by the power supply 190, the presence or absence of a coupling or other connection between the interface unit 170 and an external device.

The output unit 150 generates outputs relevant to the senses of sight, hearing, touch and the like. And, the output unit 150 includes the display 151, an audio output module 152, an alarm unit 153, and a haptic module 154 and the like.

The display 151 is typically implemented to visually display (output) information associated with the mobile terminal 100. For instance, if the mobile terminal is operated in a phone call mode, the display will generally provide a user interface (UI) or graphical user interface (GUI) which includes information associated with placing, conducting, and terminating a phone call. As another example, if the mobile terminal 100 is in a video call mode or a photographing mode, the display 151 may additionally or alternatively display images which are associated with these modes, the UI or the GUI.

The display module 151 may be implemented using known display technologies including, for example, a liquid crystal display (LCD), a thin film transistor-liquid crystal display (TFT-LCD), an organic light-emitting diode display (OLED), a flexible display and a three-dimensional display. The mobile terminal 100 may include one or more of such displays.

Some of the above displays can be implemented in a transparent or optical transmittive type, which can be named a transparent display. As a representative example for the transparent display, there is a TOLED (transparent OLED) or the like. A rear configuration of the display 151 can be implemented in the optical transmittive type as well. In this configuration, a user is able to see an object in rear of a terminal body via an area occupied by the display 151 of the terminal body.

At least two displays 151 can be provided to the mobile terminal 100 in accordance with the implemented configuration of the mobile terminal 100. For instance, a plurality of displays can be arranged on a single face of the mobile terminal 100 in a manner of being spaced apart from each other or being built in one body. Alternatively, a plurality of displays can be arranged on different laces of the mobile terminal 100.

In case that the display 151 and a sensor for detecting a touch action (hereinafter called 'touch sensor') configures a mutual layer structure (hereinafter called 'touch screen'), it is able to use the display 151 as an input device as well as an output device. In this case, the touch sensor can be configured as a touch film, a touch sheet, a touchpad or the like.

The touch sensor can be configured to convert a pressure applied to a specific portion of the display 151 or a variation of a capacitance generated from a specific portion of the display 151 to an electric input signal. Moreover, it is possible to configure the touch sensor to detect a pressure of a touch as well as a touched position or size.

If a touch input is made to the touch sensor, signal(s) corresponding to the touch is transferred to a touch controller. The touch controller processes the signal(s) and then transfers the processed signal(s) to the controller 180. Therefore, the controller 180 is able to know whether a prescribed portion of the display 151 is touched.

The audio output module 152 functions in various modes including a call-receiving mode, a call-placing mode, a recording mode, a voice recognition mode, a broadcast reception mode and the like to output audio data which is received from the wireless communication unit 110 or is stored in the memory 160. During operation, the audio output module 152 outputs audio relating to a particular function (e.g., call received, message received, etc.). The audio output module 152 is often implemented using one or more speakers, buzzers, other audio producing devices, and combinations thereof.

The alarm unit 153 outputs a signal for announcing occurrence of a particular event associated with the mobile terminal 100. Typical events include a call received event, a message received event and a touch input received event. The alarm unit 153 is able to output a signal for announcing the event occurrence by way of vibration as well as video or audio signal. The video or audio signal can be outputted via the display 151 or the audio output unit 152. Hence, the display 151 or the audio output module 152 can be regarded as a part of the alarm unit 153.

The haptic module 154 generates various tactile effects that can be sensed by a user. Vibration is a representative one of the tactile effects generated by the haptic module 154. Strength and pattern of the vibration generated by the haptic module 154 are controllable. For instance, different vibrations can be outputted in a manner of being synthesized together or can be outputted in sequence.

The haptic module 154 can generate various tactile effects as well as the vibration. For instance, the haptic module 154 generates the effect attributed to the arrangement of pins vertically moving against a contact skin surface, an effect attributable to the injection/suction power of air through an injection/suction hole, an effect attributable to a skim over a skin surface, an effect attributable to a contact with an electrode, an effect attributable to an electrostatic force, an effect attributable to representation of warm/cold sense using an endothermic or exothermic device and the like.

The haptic module 154 can be implemented to enable a user to sense the tactile effect through a muscle sense of finger, arm or the like as well as to transfer the tactile effect through a direct contact. Optionally, at least two haptic modules 154 can be provided to the mobile terminal 100 in accordance with the corresponding configuration type of the mobile terminal 100.

The memory 160 is generally used to store programs for operating the controller. Moreover, the memory 160 may temporarily store input/output data such as phonebook data, massage data, still image, and moving image. In addition, data for various patterns of vibration and/or sound outputted in case of a touch input to the touch screen can be stored in the memory 160.

The memory 160 may be implemented using any type or combination of suitable volatile and non-volatile memory or storage devices including hard disk, random access memory (RAM), static random access memory (SRAM), electrically erasable programmable read-only memory (EEPROM), erasable programmable read-only memory (EPROM), programmable read-only memory (PROM), read-only memory (ROM), magnetic memory, flash memory, magnetic or optical disk, multimedia card micro type memory, card-type memory (e.g., SD memory, XD memory, etc.), or other similar memory or data storage device. And, the mobile terminal 100 can operate in association with a web storage for performing a storage function of the memory 160 on Internet.

The interface unit 170 is often implemented to couple the mobile terminal 100 with external devices. The interface unit 170 receives data from the external devices or is supplied with the power and then transfers the data or power to the respective elements of the mobile terminal 100 or enables data within the mobile terminal 100 to be transferred to the external devices. The interface unit 170 may be configured using a wired/wireless headset port, an external charger port, a wired/wireless data port, a memory card port, a port for coupling to a device having an identity module, audio input/output ports, video input/output ports, an earphone port and/or the like.

The identity module is a chip for storing various kinds of information for authenticating a use authority of the mobile terminal 100 and can include User Identify Module (UIM), Subscriber Identify Module (SIM), Universal Subscriber Identity Module (USIM) and/or the like. A device having the identity module (hereinafter called 'identity device') can be manufactured as a smart card. Therefore, the identity device is connectable to the mobile terminal 100 via a corresponding port.

When the mobile terminal 110 is connected to an external cradle, the interface unit 170 becomes a passage for supplying the mobile terminal 100 with a power from the cradle or a passage for delivering various command signals inputted from the cradle by a user to the mobile terminal 100. Each of the various command signals inputted from the cradle or the power can operate as a signal enabling the mobile terminal 100 to recognize if it is correctly loaded in the cradle.

The controller 180 typically controls the overall operations of the mobile terminal 100. For example, the controller 180 performs the control and processing associated with voice calls, data communications, video calls, etc. The controller 180 may include a multimedia module 181 that provides multimedia playback. The multimedia module 181 may be configured as part of the controller 180, or implemented as a separate component. In addition, the controller 180 has a function of counting time.

Moreover, the controller 180 can perform a pattern recognizing process for recognizing a writing input and a picture drawing input carried out on the touch screen as characters or images, respectively.

The power supply unit 190 provides power required by the various components for the mobile terminal 100. The power may be an internal power, an external power, or combinations thereof.

Various embodiments described herein may be implemented in a computer-readable medium using, for example, computer software, hardware, or some combinations thereof. For hardware implementation, the embodiments described herein may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a selective combination thereof. Such embodiments may be also implemented by the controller 180.

For a software implementation, the embodiments described herein may be implemented with separate software modules, such as procedures and functions, each of which perform one or more of the functions and operations described herein. The software codes can be implemented with a software application written in any suitable programming language and may be stored in a memory such as the memory 160, and executed by a controller or processor, such as the controller 180.

In the following description, a method for displaying a web page according to the present disclosure will be explained by referring to FIG. 3 to FIG. 6.

Figure 3:
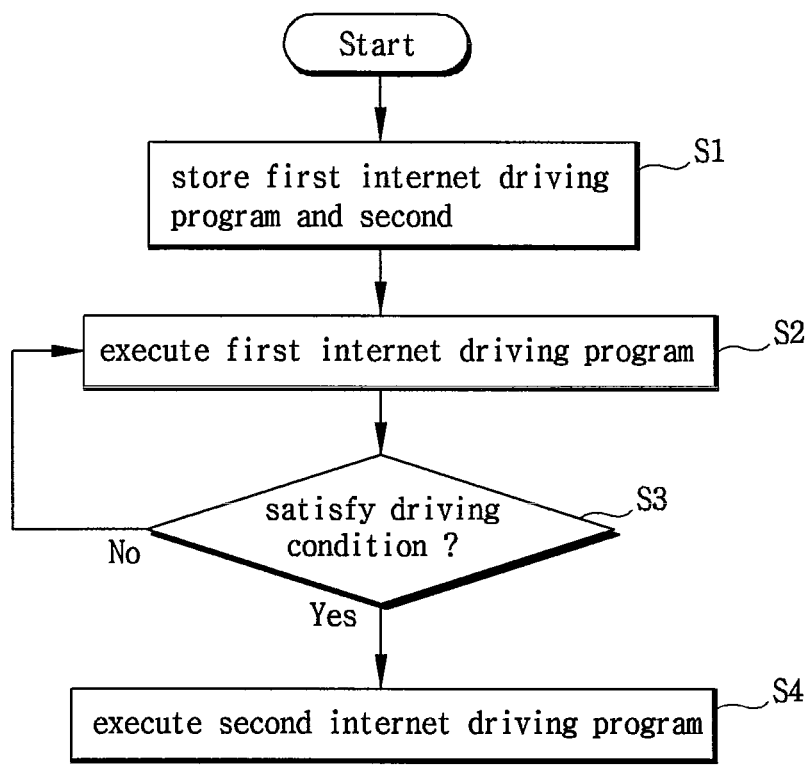
FIG. 3 is a flow chart of a method for displaying web page according to the present disclosure.
Figure 4:
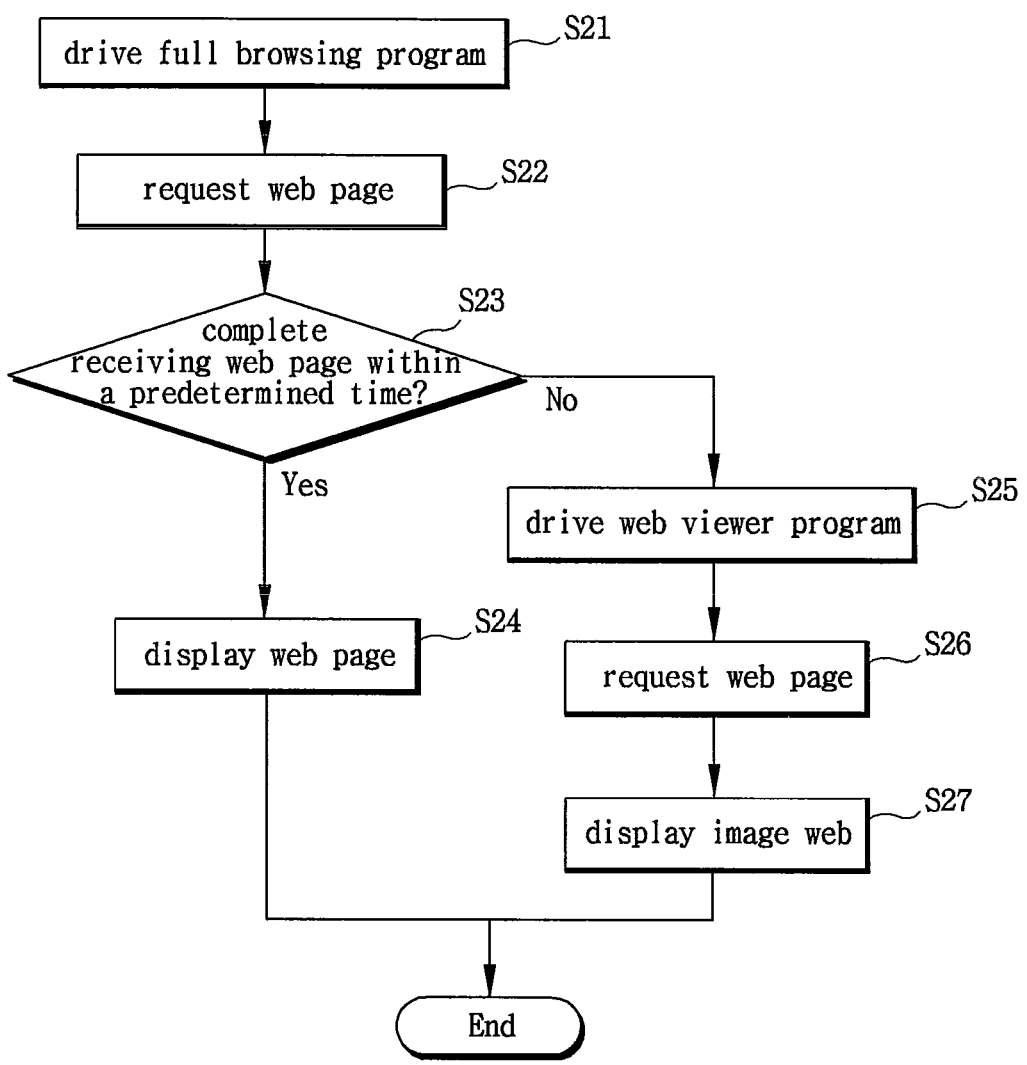
FIG. 4 is a flow chart of a method for displaying a web page, according to a first embodiment of the present disclosure.
Figure 5:
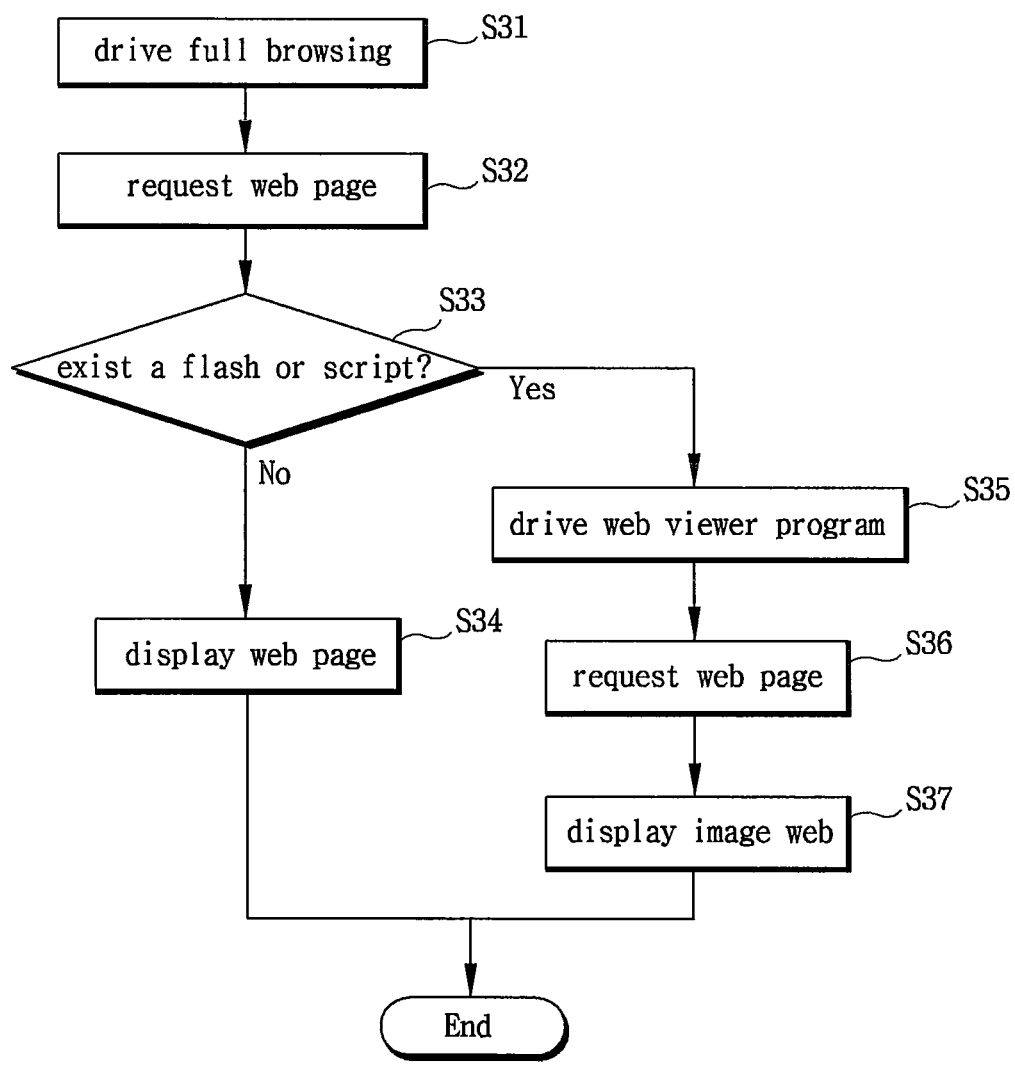
FIG. 5 is a flow chart of a method for displaying a web page, according to a second embodiment of the present disclosure.
Figure 6:
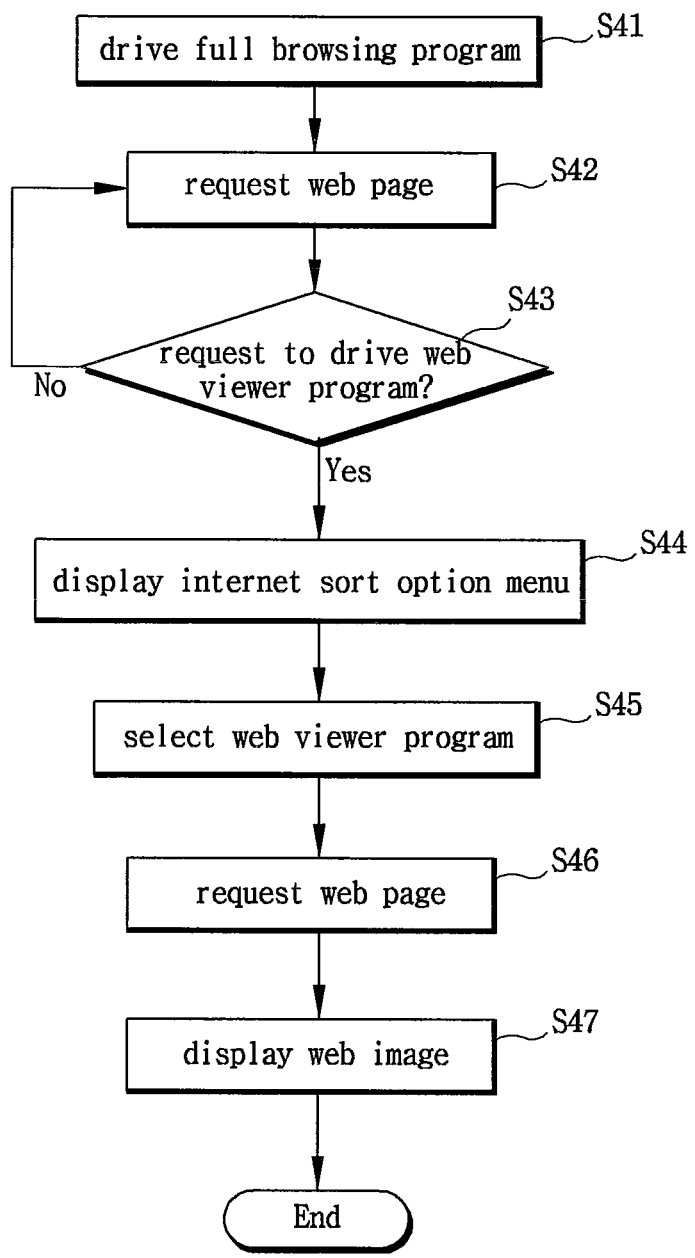
FIG. 6 of a method for displaying a web page, according to a third embodiment of the present disclosure.

FIG. 3 is a flow chart of a method for displaying web page according to the present disclosure, FIG. 4 is a flow chart of a method for displaying a web page, according to a first embodiment of the present disclosure, FIG. 5 is a flow chart of a method for displaying a web page, according to a second embodiment of the present disclosure, and FIG. 6 of a method for displaying a web page, according to a third embodiment of the present disclosure.

As shown in FIG. 3, a first internet driving program (full browsing program) and a second internet driving program (web viewer program) is stored in the memory 160 of the mobile terminal 100 (S1). A user attempts to execute the first internet driving program stored in the memory 160 through a user input unit 130 in order to display the web page on the display unit 151 (S2). Here, a controller 180 determines whether a driving condition for executing the second internet driving program is satisfied (S3). The driving condition will be described in detail by referring to FIG. 4 to FIG. 6. When the driving condition is satisfied, the first internet driving program is terminated and the second internet driving program is executed so that the web page can be displayed on the display unit 151 (S4). The full browsing program can display a dynamic display utilizing a flash and a script. In addition, the full browsing program has a good scalability that supports download/upload. However, the full browsing program has some short points that it has a slow speed, and that it requests more memories. Meanwhile, the web viewer program captures to transmit a web page image to the mobile terminal 100. Therefore, it has a better speed owing to a low load. However, the download and the upload are not supported in the web viewer program. According to the embodiment aforementioned, when the data processing capacity or the controller's processing capacity is unable to display the web page with full browsing, the present embodiment may provide a convenient internet use atmosphere by displaying the web page by driving the web viewer program.

In the following description, the driving condition for the second internet driving program will be described by referring to FIG. 4 to FIG. 6.

First Embodiment

FIG. 4 is a flow chart of a method for displaying a web page, according to a first embodiment of the present disclosure. As shown in the FIG. 4, the user executes the first internet driving program (full browsing program) through the user input unit 130 (S21). The controller calculates elapsed time from accessing the first internet program to know when a predetermined time has elapsed. The mobile terminal requests the web page server 41 to transmit a web page according to driving the full browsing program (S22). The controller 180 of the mobile terminal 100 checks whether the display of the webpage is completed (S23). If the web page's data is received within the predetermined time, the web page is displayed on the display unit 151 (S24). However, If the web page's data is not received within the predetermined time, the controller 180 executes the web viewer program stored in the memory 160 (S25). The controller 180 requests the image data transmission from the convert server 31 by executing the web viewer program (S26). The convert server 31 converts the web page to an image data, and transmits the converted image data to the mobile terminal. The image of the web page is displayed on the display unit 151 of the mobile terminal 100 (S27).

Second Embodiment

FIG. 5 is a flow chart of a method for displaying a web page, according to a second embodiment of the present disclosure. As shown in the FIG. 5, the user executes the first internet driving program (full browsing program) through the user input unit 130 (S31). The mobile terminal requests the web page server 41 to transmit a web page according to driving the full browsing program (S32). The controller 180 of the mobile terminal 100 determines whether the web page has a flash or a script (S33). If the web page does not have a flash or a script, the web page is displayed on the display unit 151 (S34). However, If the web page has a flash or a script, the controller 180 executes the web viewer program stored in the memory 160 (S35). The fact of determining whether the web page has a flash or a script is obvious to the person in the art. So, the detailed description thereto is omitted for clarity. The controller 180 requests the image data transmission from the convert server 31 by executing the web viewer program (S36). The convert server 31 converts the web page to an image data, and transmits the converted image data to the mobile terminal. The image of the web page is displayed on the display unit 151 of the mobile terminal 100 (S37).

Third Embodiment

FIG. 6 of a method for displaying a web page, according to a third embodiment of the present disclosure. As shown in the FIG. 6, the user executes the first internet driving program (full browsing program) through the user input unit 130 (S41). The mobile terminal requests the web page server 41 to transmit a web page according to driving the full browsing program (S42). The user displays an internet program sort option menu for the web viewer program on the display unit 151 through the user input unit 130 (S43, S44). The user executes a web viewer program by selecting the web viewer program in the internet program sort option menu (S45). The controller 180 requests the image data transmission from the convert server 31 by executing the web viewer program (S46). The convert server 31 converts the web page to an image data, and transmits the converted image data to the mobile terminal. The image of the web page is displayed on the display unit 151 of the mobile terminal 100 (S47).

In the aforementioned first embodiment to the third embodiment, the web viewer program is executed after executing the full browsing program. However, this order may be changed for the purpose of the user.

In the following description, implementations, where the method for displaying web page according to the present disclosure is applied, will be explained with referring to FIG. 7 and FIG. 8.

Figure 7:
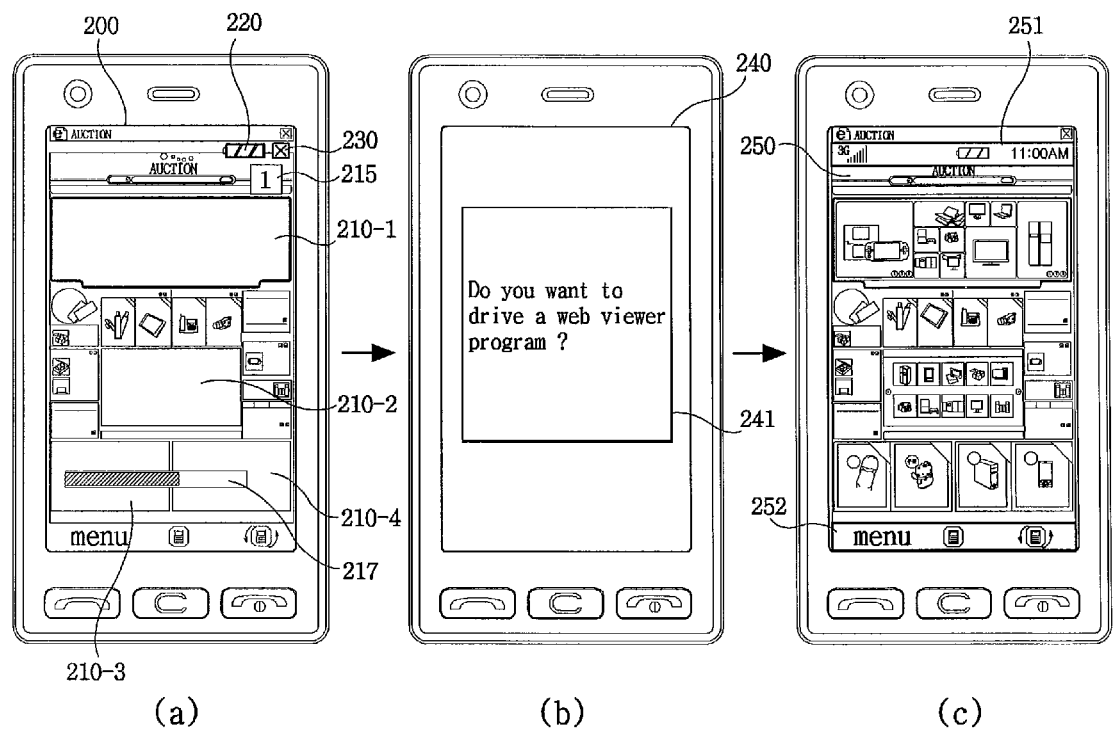
FIG. 7 illustrates image diagrams of a method for displaying a web page according to the one embodiment of the present disclosure.

FIG. 7 illustrates image diagrams of a method for displaying a web page according to one embodiment of the present disclosure. FIG. 7A illustrates a full browsing web page screen 200. The full browsing web page screen includes an internet driving program indicator 215, a progressive bar 217, a battery indicator 220 and a cancel icon 230. The internet driving program indicator plays a role in informing the sort of internet driving program presently. Also, the user may change the present internet driving program by using the internet driving program indicator 215. That is, when the user selects the internet driving program indicator 215 through the user input unit such as a touch screen, the controller 180 controls to terminate the present internet program to execute another internet program stored in the memory 160. The progressive bar 217 plays a role in informing a download state. A time counting part may be displayed on the progressive bar 217. That is, the time counting part may represent a set-up time in the first embodiment. The user may know when the second internet driving program is to be executed due to the time counting part. On the other hand, as shown in FIG. 7A, some areas 210-1, 210-2, 210-3, 210-4 including a flash or a script in the full browsing screen 200 are not displayed because of capacity of processing the data. Namely, if the data which should be processed is too much or the display of the web page is not completed within the predetermined time, a second driving program request message 241 ("Do you want to execute a web view program?") is displayed on the display unit 151 of the mobile terminal 100 (refer to FIG. 7B). If the user generates a selection signal on the message, a web viewer screen 250 is displayed on the display unit 250 (referring to FIG. 7C). The web viewer screen 250 may include an indicator area 251 of the mobile terminal 100 and an menu indicator area 252.

FIG. 8 illustrates image diagrams of a method for displaying a web page according to another embodiment of the present disclosure.

A full browsing screen 200 is shown in FIG. 8A. In a state that the full browsing screen 200 is displayed, if the user selects a menu icon 310 by using the user input unit 130, a menu item list including the menu icon 310 is displayed. As shown in FIG. 8A, the menu item list is displayed in a manner of overlay. This manner is not limited to the overlay. If an internet program sort option menu 321, one of the menu item list 320, is selected, an internet program sort option menu window 330 is displayed on the display unit 151, as shown in FIG. 8B. In this state, the user may select one of a web viewer program and a full browsing program. If the user selects the web view program, the web view program is executed and the former internet driving program (full browsing program) is terminated (refer to FIG. 8C).

FIG. 9 is a figure for explaining an HTML data which applied to one embodiment of the present disclosure. The general structure of the HTML data is not described in this description for clarity. The HTML data according to one embodiment of the present disclosure may comprise a browser set-up characteristic tag (310, 320) in the head portion. The tag 310 is a browser set-up characteristic tag for receiving the web page image from the convert server 31, and the tag 320 is a browser set-up characteristic tag for receiving a web page data from a web page provider server 41. If the mobile terminal 100 transmits a browser set-up characteristic tag to the convert server 31, the convert server 31 uses the browser set-up characteristic tag to determine whether to transmit web page image data.

Alternatively, according to another embodiment of the present disclosure, the memory 160 of the mobile 100 stores a web page program table for determining which one of the web viewer program and the full browsing program is better in each web page. When the user requests to receive the web page through the user input unit 130, the controller 160 uses the web page program table to determine whether to execute web viewer program, or to execute the full browsing program. According to this embodiment, the mobile terminal 100 may provide the user with optimum internet user interface.

As aforementioned, the method for displaying a web page and the mobile terminal using the same are not limited to the constitution and method of the embodiments. It should be understood that the person in the art may easily modify and alter the present disclosure by selectively combining the entire or part of the each embodiment.

What is claimed is:

1. A mobile terminal comprising:
   a display unit configured to display a web-page;
   a memory configured to store a first internet driving program and a second internet driving program for executing the web-page;
   a wireless communication module configured to access an internet server;
   a user input unit configured to receive a user input signal; and
   a controller configured to display an internet program sort option menu on the display unit based on the user input signal from the user input unit during an attempt to display the web-page by accessing the internet server through the wireless communication module through the first internet driving program stored in the memory, to calculate elapsed time from accessing the first internet program, to terminate the first internet driving program, and to execute the second internet driving program after termination of the first internet program, by the internet program sort option menu;
   a user input unit configured to receive a user input signal,
   wherein the controller displays a second internet driving program request message on the display unit when the driving condition is satisfied, and terminates the first internet driving program to execute the second internet driving program if a request for executing the second internet driving program is received from the user input unit,
   wherein an internet driving program indicator is displayed on the display unit, and the controller terminates the first internet driving program to execute the second internet driving program stored in the memory if the internet driving program indicator is selected, and
   wherein the controller executes the second internet driving program stored in the memory and terminates the first internet driving program, and allows a converter server to convert the web-page to an image data and displays the converted image data on the display unit through the second internet driving program, if a display of the web page is not completed within a predetermined time from accessing the first internet program.

2. The mobile terminal of the claim 1, wherein the first internet driving program is a full browsing program, and the second internet driving program is a web viewer program.

3. The mobile terminal of the claim 1, wherein the controller executes the second internet driving program stored in the memory and terminates the first internet driving program, if the web page includes one of a flash and a script.

4. The mobile terminal of the claim 1, wherein the web page comprises an HTML data having a browser characteristic tag.

5. The mobile terminal of the claim 1, wherein the first internet driving program is a program for accessing a first server, and
   the second intern et driving program is a program for accessing a second program.

6. The mobile terminal of the claim 1, wherein the converted image data includes the whole contents of the displayed web-page.

7. A mobile terminal comprising:
   a display unit configured to display a web-page;
   a memory configured to store a first internet driving program and a second internet driving program for executing the web-page;
   a wireless communication module configured to access an internet server; and
   a controller configured to determine whether a driving condition for the second internet driving program is satisfied during an attempt to display the web-page by accessing the internet server through the wireless communication module through the first internet driving program stored in the memory, to calculate elapsed time from accessing the first internet program, to terminate the first internet driving program, and to execute the second internet driving program after termination of the first internet program, by an internet program sort option menu;
   a user input unit configured to receive a user input signal,
   wherein the controller displays a second internet driving program request message on the display unit when the driving condition is satisfied, and terminates the first internet driving program to execute the second internet driving program if a request for executing the second internet driving program is received from the user input unit,
   wherein an internet driving program indicator is displayed on the display unit, and the controller terminates the first internet driving program to execute the second internet driving program stored in the memory if the internet driving program indicator is selected, and
   wherein the controller executes the second internet driving program stored in the memory and terminates the first internet driving program, and allows a converter server to convert the web-page to an image data and displays the converted image data on the display unit through the second internet driving program, if a display of the web page is not completed within a predetermined time from accessing the first internet program.

8. The mobile terminal of the claim 7, wherein the first internet driving program is a full browsing program, and the second internet driving program is a web viewer program.

9. The mobile terminal of the claim 7, wherein the controller executes the second internet driving program stored in the memory and terminates the first internet driving program, if the web page includes one of a flash and a script.

10. The mobile terminal of the claim 7, wherein the web page comprises an HTML data having a browser characteristic tag.

11. The mobile terminal of the claim 7, wherein the first internet driving program is a program for accessing a first server, and
    the second internet driving program is a program for accessing a second program.

12. The mobile terminal of the claim 7, wherein the converted image data includes the whole contents of the displayed web-page.

13. A method for displaying a web-page, the method comprising:
    storing a first internet driving program and a second internet driving program;
    attempting to display the web-page by executing the first internet driving program;

determining whether a driving condition for the second internet driving program is satisfied; and displaying the web-page by terminating the first internet driving program and by executing the second internet driving program after termination of the first internet program if the driving condition is satisfied;

displaying a second internet driving program request message on the display unit when the driving condition is satisfied, and terminating the first internet driving program to execute the second internet driving program if a request for executing the second internet driving program is received from the user input unit, displaying an internet driving program indicator on the display unit, and terminating the first internet driving program to execute the second internet driving program stored in the memory if the internet driving program indicator is selected, and wherein the step of determining whether the driving condition for the second internet driving program is satisfied comprises calculating elapsed time from attempting to display the web-page by executing the first internet driving program, and determining whether a display of the web page is completed within a predetermined time from attempting to display the web-page by executing the first internet driving program, and wherein the step of displaying the web-page comprises:

allowing a converter server to convert the web-page to an image data; and displaying the converted image data on a display unit through the second internet driving program.

14. The method of the claim 13, wherein the first internet driving program is a full browsing program, and the second internet driving program is a web viewer program.

15. The method of the claim 13, wherein the step of determining whether a driving condition for the second internet driving program is satisfied comprises determining whether the web page includes one of a flash and a script.

16. The method of the claim 13, wherein, the step of displaying the web-page by terminating the first internet driving program and by executing the second internet driving program on if the driving condition is satisfied comprises:

displaying a second driving program request message on the display unit, the second driving program request message asking whether a user want to execute the second internet driving program; and generating an input signal for driving the second internet driving program in a state of displaying the request message.

17. The method of the claim 13, wherein, the step of displaying the web-page by terminating the first internet driving program and by executing the second internet driving program on if the driving condition is satisfied comprises:

displaying an internet program sort option menu on the display unit; and selecting the second internet driving program by using the internet program sort option menu.

18. The method of the claim 13, wherein the converted image data includes the whole contents of the displayed web-page.

* * * * *